United States Patent [19]

Kita et al.

[11] Patent Number: 5,023,709
[45] Date of Patent: Jun. 11, 1991

[54] AUTOMATIC FOLLOW-UP LIGHTING SYSTEM

[75] Inventors: Kunio Kita; Shigesumi Kuwashima; Takahito Suzuki; Chikashi Seki, all of Tokyo, Japan

[73] Assignees: AOI Studio Kabushiki Kaisha; Kabushiki Kaisha Ouyo Keisoku Kenkyusho, both of Tokyo, Japan

[21] Appl. No.: 431,847

[22] Filed: Nov. 6, 1989

[51] Int. Cl.$^5$ ............................................. H04N 7/18
[52] U.S. Cl. ...................................... 358/125; 358/113
[58] Field of Search ............... 358/125, 126, 108, 229, 358/105, 185

[56] References Cited

U.S. PATENT DOCUMENTS

| | | | |
|---|---|---|---|
| 3,840,699 | 10/1974 | Bowerman | 358/125 |
| 3,944,738 | 3/1976 | Johnson | 358/125 X |
| 4,067,015 | 1/1978 | Mogavero et al. | 358/125 X |
| 4,409,661 | 10/1983 | Romanski | 358/125 X |
| 4,527,198 | 7/1985 | Callahan | 358/125 X |

*Primary Examiner*—Victor R. Kostak
*Attorney, Agent, or Firm*—Wenderoth, Lind & Ponack

[57] ABSTRACT

A mark (something like a reflecting tape which reflects light in the coaxial direction when the light is applied, or an infrared radiant) attached on an object is caught with the coaxial light (visible radiation, infrared light) by a TV camera or infrared TV camera, and video signals from the camera are processed in binary in an image processing apparatus. Consequently, a high luminous mark appears on a binary image, and the primary moment center values (so called "centroid") on the high luminous binary image are calculated on real time, for instance, every 1/60 second, and fed back to an electrically-powered driving part of a lighting unit, so that the lighting is always applied to the position. An electrically-powered turn table automatically operates the control of the lighting directions by the signals feed backed. By carrying out a series of controls precisely as mentioned above, the lighting can be applied by the lighting unit tracking automatically the position of the moving mark. The operability of a lighting unit regarded as a serious problem for an operator usually operating many lighting units can be improved to allow an effective lighting operation.

12 Claims, 6 Drawing Sheets

AUTOMATIC FOLLOW-UP LIGHTING SYSTEM

BACKGROUND OF THE INVENTION

This invention relates to an automatic follow-up lighting system capable of tracking a moving object (such as a man or advertising balloon) automatically to light up the vicinity thereof. The automatic follow-up lighting system according to the present invention allows the lighting up of a moving object in a good light or even in a bad light, so that it can be widely used as a lighting apparatus (spotlights) for a bride and bridegroom, and actors in wedding halls, banqueting halls in a hotel, theaters, and also as a novel advertising medium projecting on a moving screen such as an advertising balloon.

In conventional lighting apparatuses, the position of an object such as a man is illuminated by an operator operating a spotlight provided on an electrically-powered turntable with a joy stick or the like. It will be very difficult for only one man to operate many lighting apparatuses, since the turntable need to be operated by remote controls with one-to-one correspondence. It will be also disadvantageous that the operation requires enormous labor and experience when the lighting angle of the lighting apparatus is different by an angle viewed from an operator.

At a place such as wedding halls, theaters, and banqueting halls where a number of lighting appartuses are frequency used, improving the operability of the lighting apparatuses has been a very important assignment. Consequently, an apparatus, which is not the kind that is operated by a man controlling an electrically-powered turntable, for automatically tracking for lighting securely in response to the movement of a moving object, has been strongly desired.

SUMMARY OF THE INVENTION

This invention was made in consideration of the circumstance mentioned above and the object of the present invention is to provide an automatic follow-up lighting system which can fully, automatically operate the remote control of a lighting apparatus, which used to be operated by a man, so as to reduce the labor for operators, and ensure the lighting by the smooth and steady automatic tracking in response to the movement of an object.

Another object of this invention is to provide an automatic follow-up lighting system which allows the lighting up of a moving object in a good light or even in a bad light, and the projection of images on a moving screen.

BRIEF DESCRIPTION OF THE INVENTION

DESCRIPTION OF THE PREFERRED EMBODIMENTS

One embodiment according to the present invention is described hereinafter based on the drawings.

Figure 1:
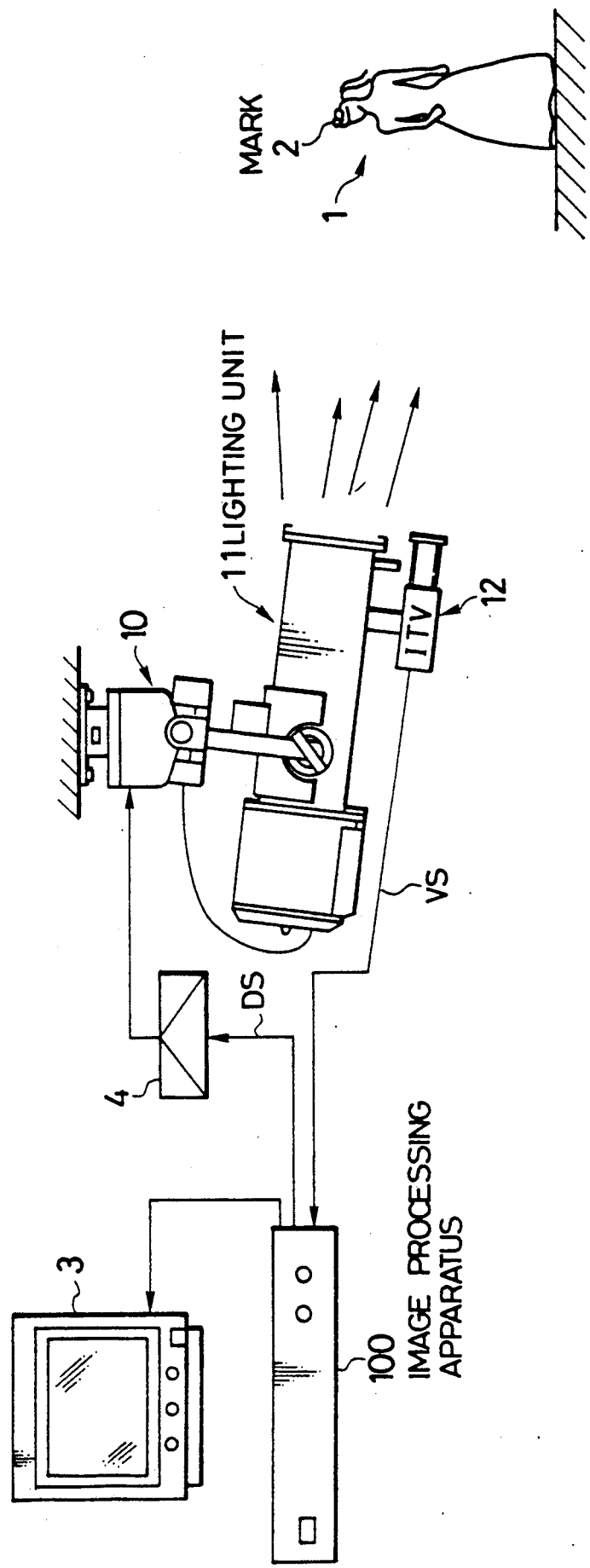
FIG. 1 shows a schematic configuration according to the present invention.

FIG. 1 shows a schematic configuration according to the present invention; a mark 2 is attached on an object 1 such as a bride. The mark 2 may be something like a reflective tape which reflects light in a coaxial direction when light is applied to it. The object 1 is illuminated by a directional lighting unit (generally called a spotlight) 11 provided on an electrically-powered turntable 10, and a TV camera (for example, ITV) 12 having a field of view covering a part of or the entire lighting range is provided with the lighting unit 11 in one body. The lighting unit 11 can illuminate arbitrarily horizontal and vertical directions with its directivity by driving the electrically-powered turntable. Video signals VS from the TV camera 12 are processed by an image processing apparatus 100 which is mentioned later, and the screen image is projected on a monitor 3 such as CRT. Drive signals DS processed by the image processing apparatus 100 drive the turntable 10 via a driving section 4 of an amplifier or the like, and control the lighting position of the lighting unit 11, so as to track the object 1, the mark 2, or the shift of the target point keeping a fixed distance away from these.

When light from the lighting unit 11 is applied to the mark 2 attached on the object 1, the light is strongly reflected on the mark 2 on which a high luminous point is taken out as an image by the TV camera 12 fixed at the lighting unit 11, and the video signals VS are processed in binary form in the image processing apparatus 100. A central value of a primary moment on a binary image is calculated in real time, for example, every 1/60 second, and signals corresponding to the shift are transmitted on the basis of the positional data to the turntable 10 of the lighting unit 11 via the driving section 4. The turntable 10 is controlled by the signals, so that the lighting directions (panning, tilting) of the lighting unit 11 can be automatically changed, and an automatic follow-up lighting up is carried out for a moving object, mark, or a target point keeping a fixed distance away from these.

Figure 2:
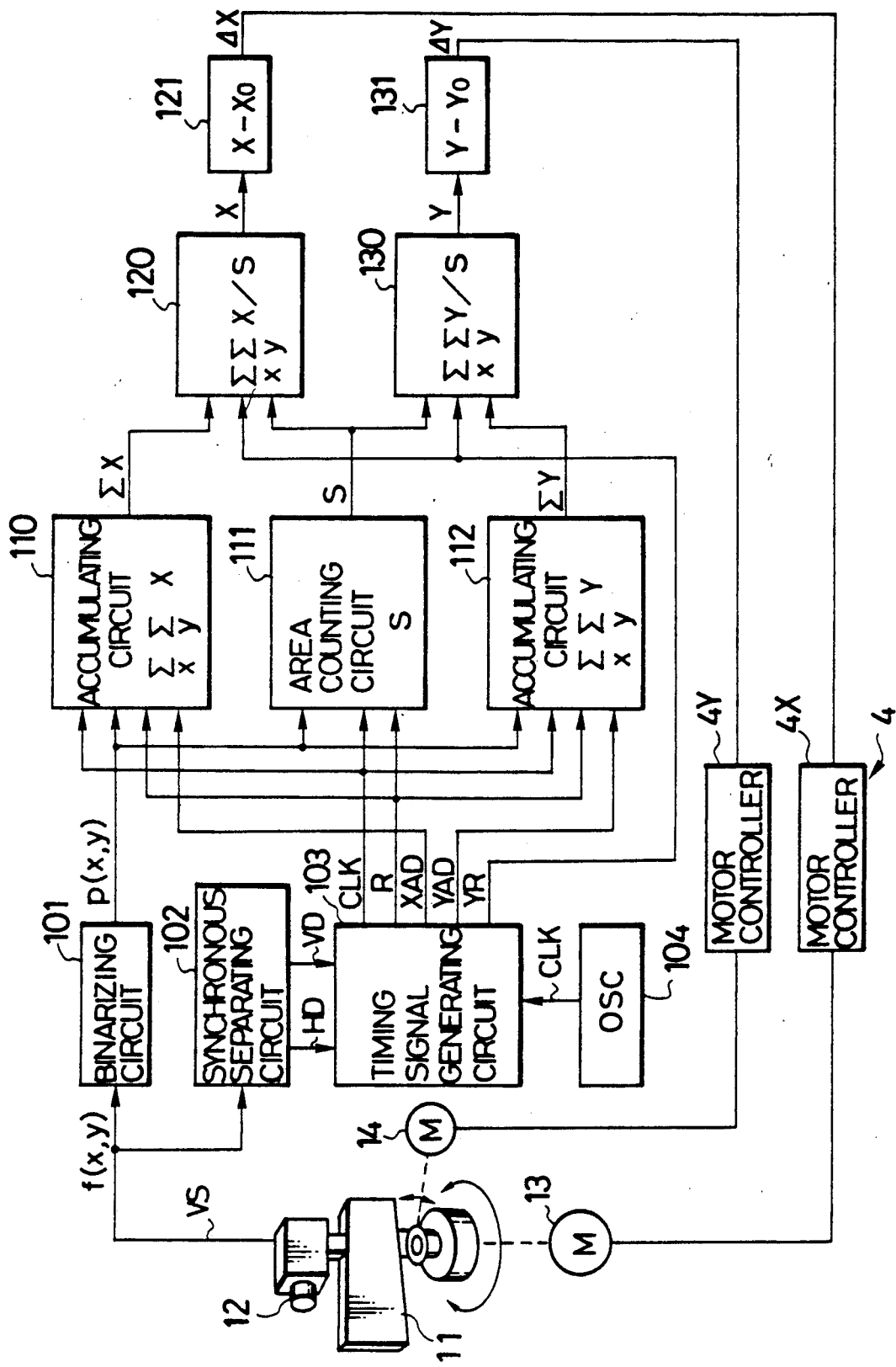
FIG. 2 shows a block diagram of a control system according to the present invention.
Figure 3:
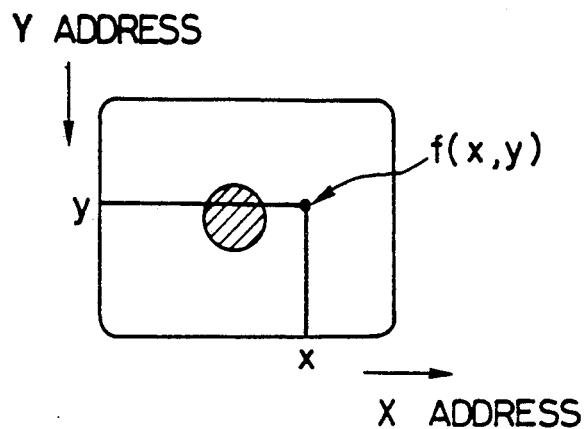
FIG. 3 shows the relationship between video signals and images.

In FIG. 2, the image processing apparatus 100 is described in detail; the lighting unit 11 fixed to the turntable 10 is rotated in the horizontal direction by a motor 13, and in the vertical direction by a motor 14. A lighting operation to the arbitrarily directions can be carried out in combination with these rotations. A TV camera 12 of which an imaging part is provided with a lens system having an field of view covering a part of or the entire lighting range of the lighting unit 11, outputs a two-dimensional address information f(x,y) as video signals VS in time series. The video signals VS are input to a binarizing circuit 101, and converted into binary signals P(x,y) represented by "0" or "1" with a predetermined threshold T. FIG. 3 shows the relationship between image information (diagonally lined part) and X-Y address, and illustrates that f(x,y) is video signals VS on an address X and an address Y. In the binarizing circuit 101, if f(x,y)≧T(threshold) then P(x,y)=1, if f(x,y)<T then P(x,y)=0.

Figure 4:
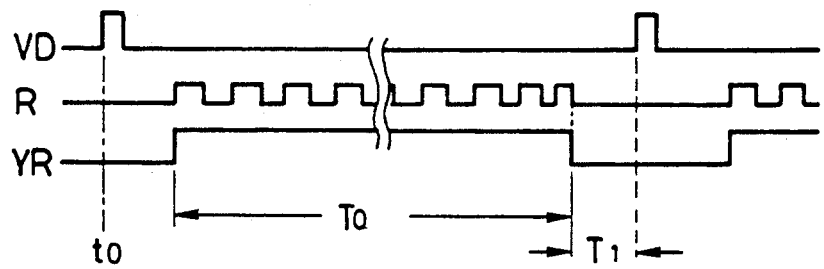
FIG. 4 shows a time chart illustrating an example associated with an input-output of a timing generating circuit.

The video signals VS are input to a synchronous separating circuit 102 in which they are divided into horizontal synchronous signals HD and vertical synchronous signals VD, and input into a timing signal generating circuit 103. Clock signals CLK from a clock generating circuit 104 have been input into the timing signal generating circuit 103, the clock signals CLK have been output at the timing in response to the horizontal resolution of an image. The timing signal generating circuit 103 outputs the clock signals CLK which are input into accumulating circuits 110, and 112 and an area counting circuit 111, and outputs signals R indicating a measuring range in the image information and similarly output signals R are input into the accumulating circuits 110, and 112 and the area counting circuit. Furthermore, the timing generating circuit 103 generates horizontal address signals XAD which are input into the accumulating circuit 110, and generates vertical address signals YAD which are input into the accumulating circuit 112, and generates signals YR indicating the completion of measuring which are input into calculating circuits 120, and 130. For each timing of the vertical synchronous signals, signals R indicate the measuring range, and signals YR indicating the completion of measuring as shown in FIG. 4.

Figure 5:
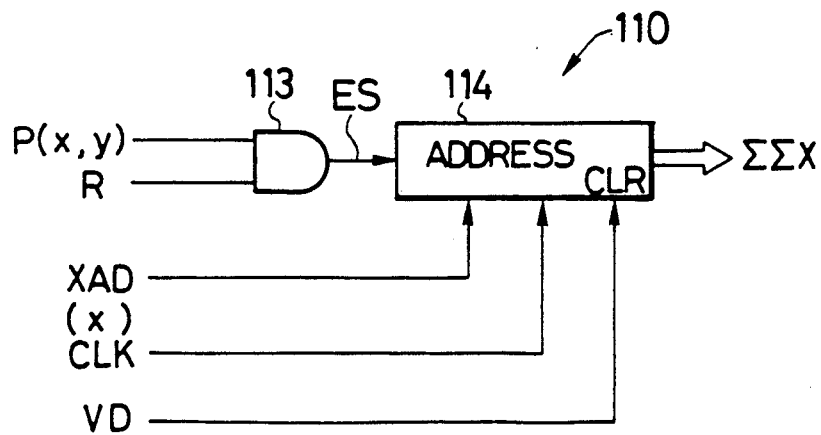
FIG. 5 shows a block diagram illustrating an example of an accumulating circuit.
Figure 6:
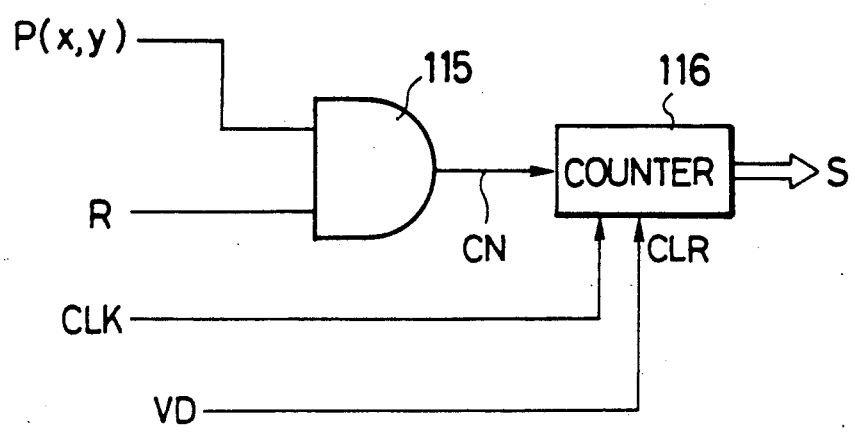
FIG. 6 shows a block diagram illustrating an example of an area counting circuit.

The accumulating circuit 110 calculates ΣΣX, and the accumulating circuit 112 calculates ΣΣY; both circuits are of the same configuration. That is, the accumulating circuit 110 as shown in FIG. 5, is provided with an AND circuit 13 and an adder 114, and the adder is activated to add the address signals XAD sequentially at the timing of the clock signals only when both binary signal P(x,y) and signals R indicate the measuring range are "1" and an enable signal is also "1". The adder 114 is also cleared by inputting the vertical synchronous signals VD, and the added output ΣΣX represents ΣΣP(x,y)×x. Similarly, the output ΣΣY of the accumulating circuit 112 represents ΣΣP(x,y)×y. These added values ΣX and ΣY are input into the calculating circuits 120, and 130, respectively. The configuration of the area counting circuit 111 is as shown in FIG. 6, a counter 116 is cleared by the vertical synchronous signals VD, counting with the clock signals CLK the output CN from the AND circuit 115 into which the binary signals P(x,y) and signals R indicating the measuring range are input, and outputs area S as a counted value. The counted area S is input into the calculating circuit 120 and 130.

The calculating circuits 120 and 130 divide the accumulated results (a primary moment) for X axis and Y axis, respectively, by the area S (the moment of the zero degree) after the signals YR indicating the completion of measuring are input, and calculate the center position of the mark 2 to output X(=ΣΣX/S) and Y(=ΣΣY/S), and the output values are initialized. FIG. 4 shows the circumstances, wherein the S, ΣX, ΣY are initialized by the input of the vertical synchronous signals VD (at the time $t_0$, $t_1$), and the S, ΣX, ΣY are measured during the time $t_0$, and the measured values are initialized during the time $t_1$.

Figure 7:
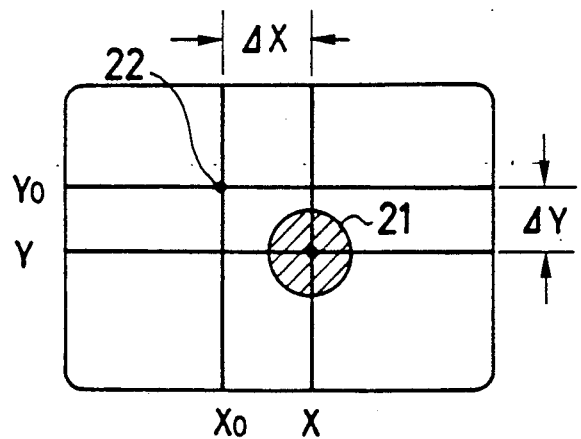
FIG. 7 shows the relationship between a center position of balance on a mark and a position of an object.
Figure 8:
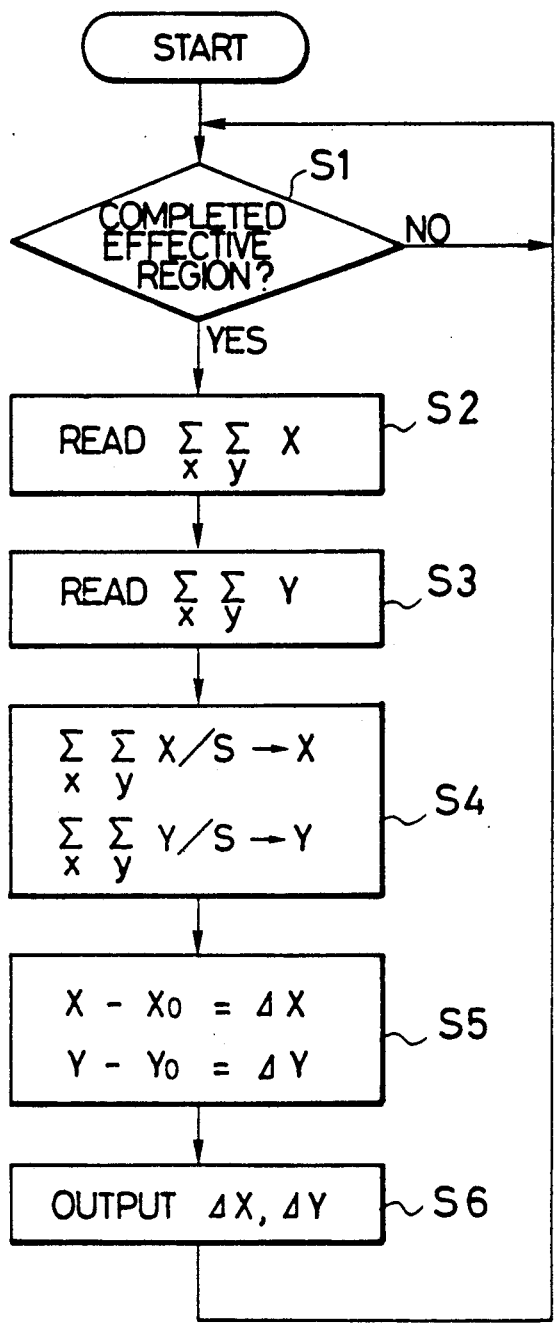
FIG. 8 shows a flowchart illustrating an example of calculations by shoftware.

Calculating circuits 121 and 131 calculate the differences ΔX and ΔY between the center position 21 of the mark 2 and the position of the target 22 as shown in FIG. 7. Generally, the center position 21 of the mark 2 is on the position of the target 22, though it keeping a fixed distance away from the mark 2 is sometimes required. For example, there is the mark on the head of bride, though, lighting up in the vicinity of her chest about 50 cm under the mark will be much more effective. The differences ΔX and ΔY calculated by the calculating circuits 121, and 131, are input into motor controllers 4X, and 4Y, respectively, and the motor controllers drive motors 13, and 14, respectively, and the differences are fed back until a difference between the position of the target 22 and the center of a screen is obtained. The position of the target for lighting can be changed by adding an external predetermined element. The configuration as mentioned above is all provided with hardware by using the calculating circuits 120, and 121 and 130, and 131, through, a configuration with software can be also possible by using a microcomputer in accordance with the flowchart shown in FIG. 8.

As an imaging means, a solid-state imaging element composed of a CCD, or an infrared TV camera may be used, instead of a TV camera used in the embodiment described above. The configurations of the blocks as shown in FIG. 5 and FIG. 6 are not limited by this embodiment.

Figure 9:
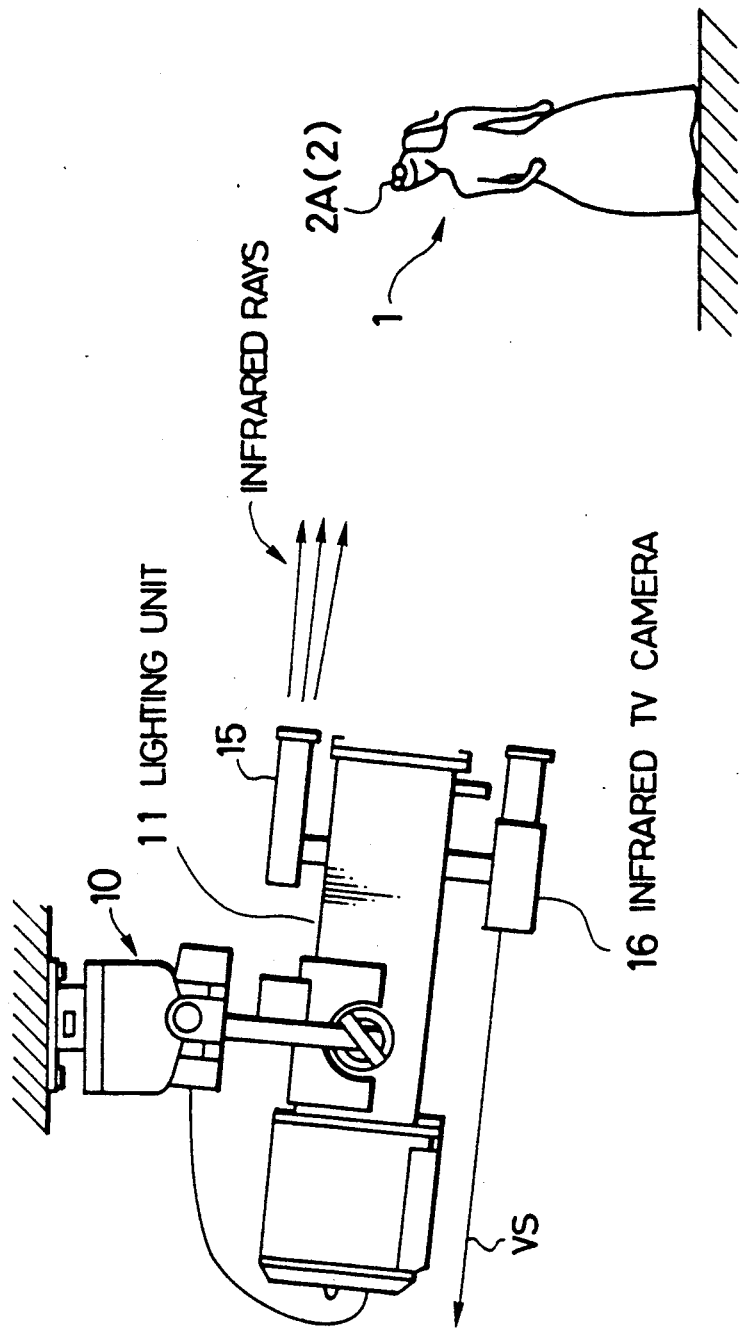
FIG. 9 shows another embodiment according to the present invention.

FIG. 9 shows another embodiment according to the present invention; in this example, an object 1 has an infrared radiant 2A as a mark. The mark as described above may be also used. A lighting unit 11 has an infrared rays irradiation apparatus 15 provided thereon and an infrared TV camera 16 fixed therewith in one body. In this configuration, similarly, the lighting unit 11 illuminates the object as mentioned above; however, even in the case that the lighting unit 11 is not lit or the place is in a bad light, by applying infrared rays from the infrared rays irradiation apparatus, an infrared light is radiated from the infrared rays radiant attached on object 1 even in the bad light. In the case of the mark 2, the irradiated infrared rays are reflected. The infrared rays (or the infrared rays reflected on the mark 2) radiated from the infrared rays radiant 2A are caught by an infrared TV camera 16, whereby the object 1 is automatically tracked by the lighting unit 11. On an application to a stage, in the case of lighting with the lighting unit 11, an actor has been tracked under the light since he appeared on the stage from the wing. That is, the infrared rays irradiation apparatus 15 is kept "on" even while the lighting unit 11 is of, and the infrared light from the infrared rays radiant 2A (or mark 2) is caught by the infrared TV camera 16 and automatically tracked. In the case of darkening the stage when the actor appears on the stage from the wing, the lighting unit 11 is turned off, though, an invisible infrared light is irradiated from the infrared rays irradiation apparatus 15, so that the infrared light from the infrared rays radiant 2A (or mark 2) is caught by the infrared TV camera 16 and automatically tracked, and it is possible to create a dramatic stage effect, for instance, by turning on the lighting unit 11 to shoot a spotlight on the actor when he just reaches the center of the stage. That is, the actor can be tracked by the infrared rays even in a dark place, so that by only turning on the lighting unit 11 when the actor reaches the center of the stage, the spotlight can be aimed exactly on the actor.

By using infrared rays, an infrared ray radiant element attached to on a remote moving object such as advertising balloon can be tracked by the infrared TV camera, therefore, projecting images on the moving object by an image projection apparatus such as a slide, projector or movie projector, can be used as an advertising medium.

As mentioned above, the use of the automatic follow-up lighting system according to the present invention require no operator, and allows a high speed, responsive, smooth tracking. A plurality of the apparatuses can also easily cooperate. Furthermore a steady, high precision measuring system can be obtained, since the center of balance as the position of an object is calculated with a binary image, and the operation is suitable for calculation by software and it is also a cost effective real time measurement.

What is claimed is:

1. An automatic follow-up lighting system for automatically following an object having a mark thereon, said system comprising:
   a turntable pivotable arbitrarily in a vertical and a horizontal direction;
   a lighting unit fixed to said turntable and having directivity;
   an imaging means having a field of view covering at least a part of a lighting range provided by said lighting unit, said imaging means producing output signals corresponding to said field of view thereof;
   a calculating controller means for processing said output signals obtained from said imaging means to determine a position of the mark on the object and to drive said turntable so as to track the mark on the object.

2. An automatic follow-up lighting system according to claim 1, wherein said imaging means is a TV camera.

3. An automatic follow-up lighting system according to claim 1, wherein said imaging means is fixed to said turntable.

4. An automatic follow-up lighting system according to claim 2, wherein said calculating controller means includes a binarizing circuit by which video signals from said TV camera are processing in binary form, a timing generating means separating said video signals into horizontal signals and vertical signals to output timing signals, an accumulating circuit for receiving binary signals from said binarizing circuit and said timing signals to obtain accumulated values $\Sigma X$ for X direction and $\Sigma Y$ for Y direction, an area counting circuit for receiving said binary signals and said timing signals to output an area S, a first calculating means for receiving said accumulated values $\Sigma X$, $\Sigma Y$, and the area S to obtain the center position of balance (X, Y) of said mark, and a second calculating means for obtaining a difference between said center position (X, Y) and a predetermined desired target position ($X_O$, $Y_O$) offset from said center position of said mark.

5. An automatic follow-up lighting system according to claim 4, wherein said timing generating means includes a synchronous separating circuit for separating said horizontal synchronous signals and vertical synchronous signals from said video signals, a clock generating circuit for outputting clock signals of a fixed frequency, and a timing signal generating circuit for receiving said horizontal synchronous signals, vertical synchronous signals, and clock signals and for outputting said timing signals.

6. An automatic follow-up lighting system according to claim 4, wherein said accumulating circuit includes an adder and an AND circuit for outputting enable signals of said adder.

7. An automatic follow-up lighting system according to claim 4, wherein said area counting circuit includes an AND circuit and a counting circuit counting the output of said AND circuit for with said clock signals.

8. An automatic follow-up lighting system according to claim 2, wherein an automatic tracking of said TV camera keeping a fixed offset away from said mark is carried out.

9. An automatic follow-up lighting system according to claim 1, wherein said imaging means is a solid-state imaging element.

10. An automatic follow-up lighting system for automatically following an object having a mark thereon, said system comprising:
    a turntable pivotable arbitrarily in a vertical and a horizontal direction;
    a lighting unit fixed to said turntable and having directivity;
    an infrared irradiation apparatus fixed to said turntable;
    an infrared imaging means fixed to said turntable and having a field of view covering at least a part of the lighting range and irradiating range respectively provided by said lighting apparatus and infrared irradiation apparatus, said imaging means producing output signals corresponding to said field of view thereof;
    a calculating controller means for processing said signals obtained from said imaging means to determine a position of the mark on the object and to drive said turntable so as to track the mark on the object.

11. An automatic follow-up lighting system according to claim 10, wherein said lighting unit is an image projection apparatus.

12. An automatic follow-up lighting system according to claim 10, wherein said imaging means is a TV camera.

* * * * *